United States Patent
Sun

(10) Patent No.: US 8,782,629 B2
(45) Date of Patent: Jul. 15, 2014

(54) ASSOCIATING PROGRAM EXECUTION SEQUENCES WITH PERFORMANCE COUNTER EVENTS

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1711 days.

(21) Appl. No.: 11/172,130

(22) Filed: Jun. 29, 2005

(65) Prior Publication Data

US 2007/0006032 A1 Jan. 4, 2007

(51) Int. Cl.
*G06F 9/44* (2006.01)
*G06F 9/45* (2006.01)

(52) U.S. Cl.
USPC ............................ 717/158; 717/127; 717/130

(58) Field of Classification Search
None
See application file for complete search history.

(56) References Cited

U.S. PATENT DOCUMENTS

| | | | | |
|---|---|---|---|---|
| 7,363,656 | B2* | 4/2008 | Weber et al. | 726/23 |
| 7,487,502 | B2* | 2/2009 | Wang et al. | 717/127 |
| 7,735,072 | B1* | 6/2010 | Altman et al. | 717/158 |
| 7,779,238 | B2* | 8/2010 | Kosche et al. | 717/130 |
| 7,877,742 | B2* | 1/2011 | Duale et al. | 717/158 |
| 8,032,875 | B2* | 10/2011 | Kosche et al. | 717/158 |
| 8,136,124 | B2* | 3/2012 | Kosche et al. | 717/130 |
| 8,166,462 | B2* | 4/2012 | Kosche et al. | 717/130 |
| 8,176,475 | B2* | 5/2012 | Kosche et al. | 717/127 |
| 8,640,114 | B2* | 1/2014 | Kosche et al. | 717/158 |
| 2004/0133395 | A1* | 7/2004 | Ding et al. | 702/182 |
| 2004/0158818 | A1* | 8/2004 | Smith et al. | 717/127 |
| 2004/0216097 | A1* | 10/2004 | Sun | 717/127 |
| 2005/0132371 | A1* | 6/2005 | Lopez-Estrada | 718/100 |
| 2006/0230392 | A1* | 10/2006 | Duale et al. | 717/130 |
| 2007/0006032 | A1* | 1/2007 | Sun | 714/30 |
| 2008/0109796 | A1* | 5/2008 | Kosche | 717/158 |
| 2008/0127116 | A1* | 5/2008 | Kosche et al. | 717/130 |
| 2008/0127120 | A1* | 5/2008 | Kosche et al. | 717/127 |
| 2008/0127149 | A1* | 5/2008 | Kosche et al. | 717/158 |

OTHER PUBLICATIONS

Moore et al., "Improving Time to Solution with Automated Performance Analysis", Dec. 10, 2004, University of Tennessee, pp. 1-12.*
Browne et al., "A Scalable Cross-Platform Infrastructure for Application Performance Tuning Using Hardwaer Counters", 2000 IEEE, pp. 1-13.*
Cohen et al., "Correlating instrumentation data to system states: aA building block for automated diagnosis and control", SLIC-OSDI2004, pp. 1-12.*
Browne et al., "A Portable Programming Interface for Performance Evaluation on Modern Processors", IJHPC2000, pp. 1-22.*
Sherwood et al., "Phase Tracking and Prediction", Jun. 2003, University of California, San Diego, pp. 1-12.*
Duesterwald et al., "Characterizing and Predicting Program Behavior and its Variability", 2003, IEEE, pp. 1-12.*
Gu et al., "Using hardware data to detect repetitive program behavior", Mar. 14, 2007, McGill University, pp. 1-14.*

(Continued)

*Primary Examiner* — Thuy Dao
*Assistant Examiner* — Ben C Wang
(74) *Attorney, Agent, or Firm* — Trop, Pruner & Hu, P.C.

(57) ABSTRACT

Software performance may be improved by collecting and correlating performance counter events and program execution state information. On each successive callback of performance counter data, a statistical exponential moving average association matrix may be updated until particular performance counter events and program execution states may be correlated.

14 Claims, 3 Drawing Sheets

(56) References Cited

OTHER PUBLICATIONS

Lau et al., "The Strong Correlation Between Code Signatures and Performance", Mar. 2005, IEEE, pp. 1-12.*

Davies et al., "iPART: An Automated Phase Analysis and Recognition Tool", Technical Report—IR-TR-2004-1-iPART, Intel Corporation, Feb. 2004, pp. 1-12; <ftp://download.intel.com/research/library/IR-TR-2004-1-iPART.pdf>.*

Annavaram et al., "The Fuzzy Correlation between Code and Performance Predictability", MICRO-37 The 37th Annual International Symposium on Microarchitecture Portland, OR, USA—Dec. 4-8, 2004, published by IEEE on Dec. 12, 2005 <http://ieeexplore.ieee.org/xpls/abs_all.jsp?arnumber=1550985&tag=1>.*

Annavaram et al., The Fuzzy Correlation between Code and Performance Predictability, 2004 IEEE, MICRO-37'04, Microarchitecture Research Lab (MRL), Systems Technology Labs (STL), Intel® Corporation, Dec. 4-8, 2004, Conference Publication, pp. 1-12; <http://ieeexplore.ieee.org/stamp/stamp.jsp?tp=&arnumber=1550985>.*

Davies et al., "iPART: AN Automated Phase Analysis and Recognition Tool", IR-TR-2004-iPART, Intel Corporation, Feb. 2004, pp. 1-12; <ftp://download.intel.com/research/library/IR-TR-2004-1-iPART.pdf>.*

Annavaram et al., "The Fuzzy Correlation between Code and Performance Predictability", 2004 IEEE, MICRO-37'04, pp. 1-12; <http://ieeexplore.ieee.org/stamp/stamp.jsp?tp=&arnumber=1550985>.*

Arulraj et al., "Production-Run Software Failure Diagnosis via Hardware Performance Counters", 2013 ACM, ASPLOS'13, Mar. 16-20, 2013, Houston, Texas, USA, pp. 101-112; <http://dl.acm.org/results.cfm?h=1&cfid=417702354&cftoken=80698340>.*

Chilimbi et al., "Dynamic Hot Data Stream Prefetching for General-Purpose Programs", PLDI'02, 2002, Berlin, Germany.

* cited by examiner

ASSOCIATING PROGRAM EXECUTION SEQUENCES WITH PERFORMANCE COUNTER EVENTS

BACKGROUND

This invention relates generally to increasing the performance of software.

Software developers would ideally like their software to execute as optimally as possible on any given platform. To do so, they may obtain information about how particular processors execute software code. For example, some processors include performance counters. The performance counters can be programmed to count a given type of event and/or to determine its duration. For example, the performance counter may be programmed to count cache misses. A number of other similar events may be counted as well.

However, the usefulness of this information may be somewhat limited, due to a lack of correlation with program execution progress. Therefore, software developers also look to other types of information to see how their code is running on a given system. Program execution sequences represent states or points in time in a program execution. The state structure can be in software, hardware, or a combination of the two. The state structure may or may not contain instruction pointer information. Examples of program execution sequences are software transactions or patterns or hardware-detected phases.

Thus, the software developer has disparate information at his or her disposal. The software developer may obtain information about performance counter events and may obtain information about program execution sequences. In general, these two sources of information are disparate in time in that they may not be linked to one another in any way. The information must be used separately and the combined effect of the data is effectively lost.

Thus, there is a need for ways to better use information to improve the performance of software code.

DETAILED DESCRIPTION

A software designer desiring to improve the performance of a software code for a particular computer platform may obtain certain information. For example, program counter events may be programmed for counting by Itanium brand processors. The program counter counts the number of events of a preselected type. Thus, as one example, the program counter may be set to count the number of cache misses, if that particular event is one selected by the programmer.

Generally, the program counter buffers some given number of such events and when the number exceeds or overflows the buffer, the performance counter issues a callback. The callback advises the system of the fact that the buffer is overflowing, indicating that a given number of performance counter events of the specified type have occurred, in one embodiment of the present invention.

At the same time, the programmer may trap information about certain program execution sequences or states. Computer program execution can often be characterized as a time sequence of patterns, such as loops, functions, transactions, states, or phases. Those sequences can be detected either through software instrumentation and/or hardware sampling. Capturing a repetitive program execution sequence can be exploited for performance optimization. The program execution sequences or states may be, as examples, software transactions, patterns, or hardware detected phases of interest to the programmer. In general, the programmer may obtain information about any series or sequence of software execution events in a known order. Thus, the program execution sequence is simply a sequence of software execution events in some determinable order.

Figure 1:
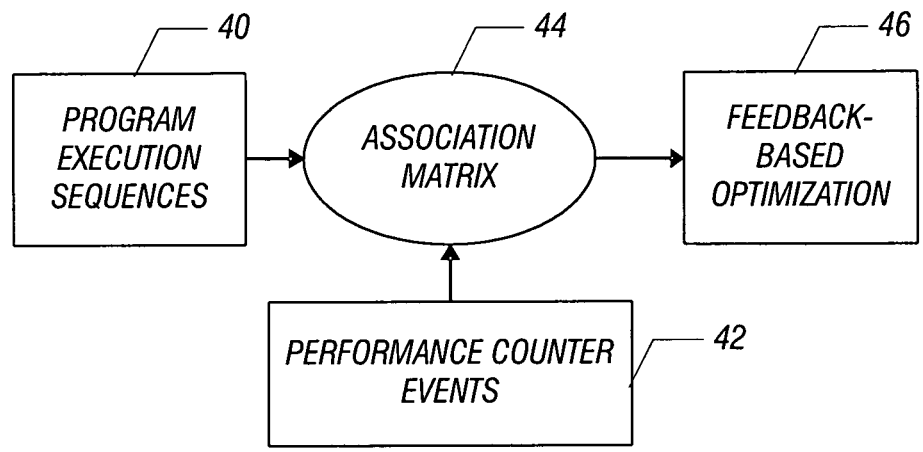
FIG. 1 is a schematic depiction of one embodiment of the present invention.

In one embodiment, an association matrix 44, shown in FIG. 1, may be used to correlate the program execution sequences 40 and the performance counter events 42. The association matrix 44 provides a feedback-based optimization 46 which correlates particular performance counter events to particular program execution sequences.

Figure 2:
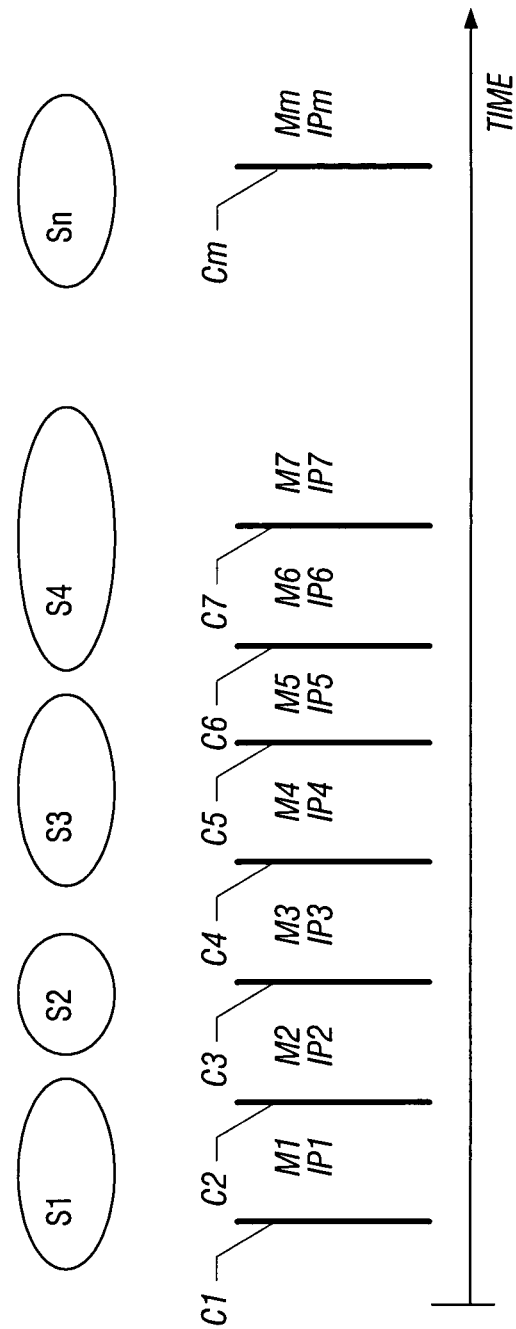
FIG. 2 is a schematic depiction of a plurality of software execution sequences and unassociated performance counter events.

In FIG. 2, a program execution sequence, including states S1-Sn, occurs over time, as indicated by the lateral extents of the ovals representing each state over a time line. In addition, at various times (which may or may not correlate to any particular program execution state), performance counter events may be generated which are indicated as M1-Mm. In this case, each of the program counters M is associated with a particular instruction pointer IP1-IPm, but this need not necessarily be the case. At periodic intervals, callbacks C1-Cm may occur from the performance counters. Each callback indicates, to the system and to the association matrix, that the buffer of a performance counter is overflowing, indicating a given number of performance counter events of the type being programmably monitored by a performance counter.

In some embodiments of the present invention, each time a new callback occurs, such as the callback C2 after the callback C1, the association matrix 44 may be updated. In effect, the callbacks provide time benchmarks for the analysis of the intervening software execution events. Thus, if a callback occurs at C1 and a callback occurs at C2, it would be known that during that time a performance counter M1 overflow occurred with an instruction pointer 1 and it can be readily determined that, during that time, a program execution state S1 was detected. Since the system is the one that is actually running the program execution sequence and the program execution state corresponds to execution events that are generated by that program, monitoring software can readily determine what program execution states have occurred between successive callbacks. The association matrix 44 may be developed to correlate the program execution sequences with the performance counter events and, in some cases, their instruction pointers. Thus, in the embodiment shown in FIG. 2, M1-Mm hardware performance counters may detect some number m performance count events. Each performance counter event Mj may also have an associated instruction pointer address in some cases. Each set of performance counter events may be successively incremented from 0 to the ith event and may be correlated to sequentially numbered callbacks C1-Cm. Thus, the events associated with a particular callback may be denoted by an m-dimensional vector M and the states detected between the (i-1)th through the ith callback may be denominated by an n-dimensional S.

Thus, if we assume that there is an association between a state Si and multiple performance counter events Mj, the following association equation will hold:

$$Si = \Sigma_j Aij * Mj,$$

or in matrix form:

$$S = A*M,$$

where A is an N×M association matrix.

However, a single callback measurement is not sufficient to establish an association between M and S, as a single performance counter event and the M vector can belong to multiple states in vector S. This association problem may be solved using statistical moving average approximation through multiple callbacks in one embodiment of the present invention. Upon each successive callback, the statistical moving average approximation may be recalculated and thereby improved.

Initially, a first order association is assumed to all states for any performance counter events. In other words, it is assumed that all performance counter events belong to all of the program execution states that have occurred in the same time interval. Of course, this estimation is wrong, but can be progressively improved with successive callbacks.

At each subsequent callback, relevant association matrix elements are calculated to reflect the new information. This successive calculation eventually eliminates accidental associations between states and performance counter events through multiple measurements.

The association matrix A may be updated each time a callback is executed. Depending on whether a state Si is detected in the interval from the previous to the current callback, the matrix element Aij is updated differently. If an Mj event is detected during a callback interval:

$$Aij \leftarrow (Aij*(T-2)+2)/T$$

and if an event is not detected during a callback interval:

$$Aij \leftarrow Aij*(T-2)/T$$

where T is the number of callback intervals for the exponential moving average.

Upon the start of the algorithm, initial values of the matrix may be set to:

Aij←1 if an Mj event is detected; and
Aij←0 if an Mj event is not detected.

If T is reasonably large, Aij approaches the exact statistical probability of a performance counter event Mj being associated with a given state Si.

The vectors S and M may not need to include all of the states and performance counter events. A typical server workload is often denominated by a small set of reoccurring program states. Performance counter events, such as read cache misses, are also often concentrated in a few top delinquent loads. Thus, the association matrix 44 may be tuned to obtain good performance benefits, while keeping the overhead reasonably low.

The association matrix 44 may then be used for a variety of feedback-based optimizations. For example, the matrix element Aij describes the probability of association between a state Si and the performance counter event Mj. If M represents cache misses and if Aij is greater than a certain preset threshold, then, it can be concluded that Mj is a delinquent miss that is associated with state Si. A prefetch of Mj as soon as Si is detected may be a good approach to improve memory latency of an application, as one example.

Thus, in some embodiments of the present invention, a statistical association may be established between disparate time sequence of program execution states and performance counter events. This association may provide a foundation for a new class of feedback-based performance optimization opportunities.

Figure 3:
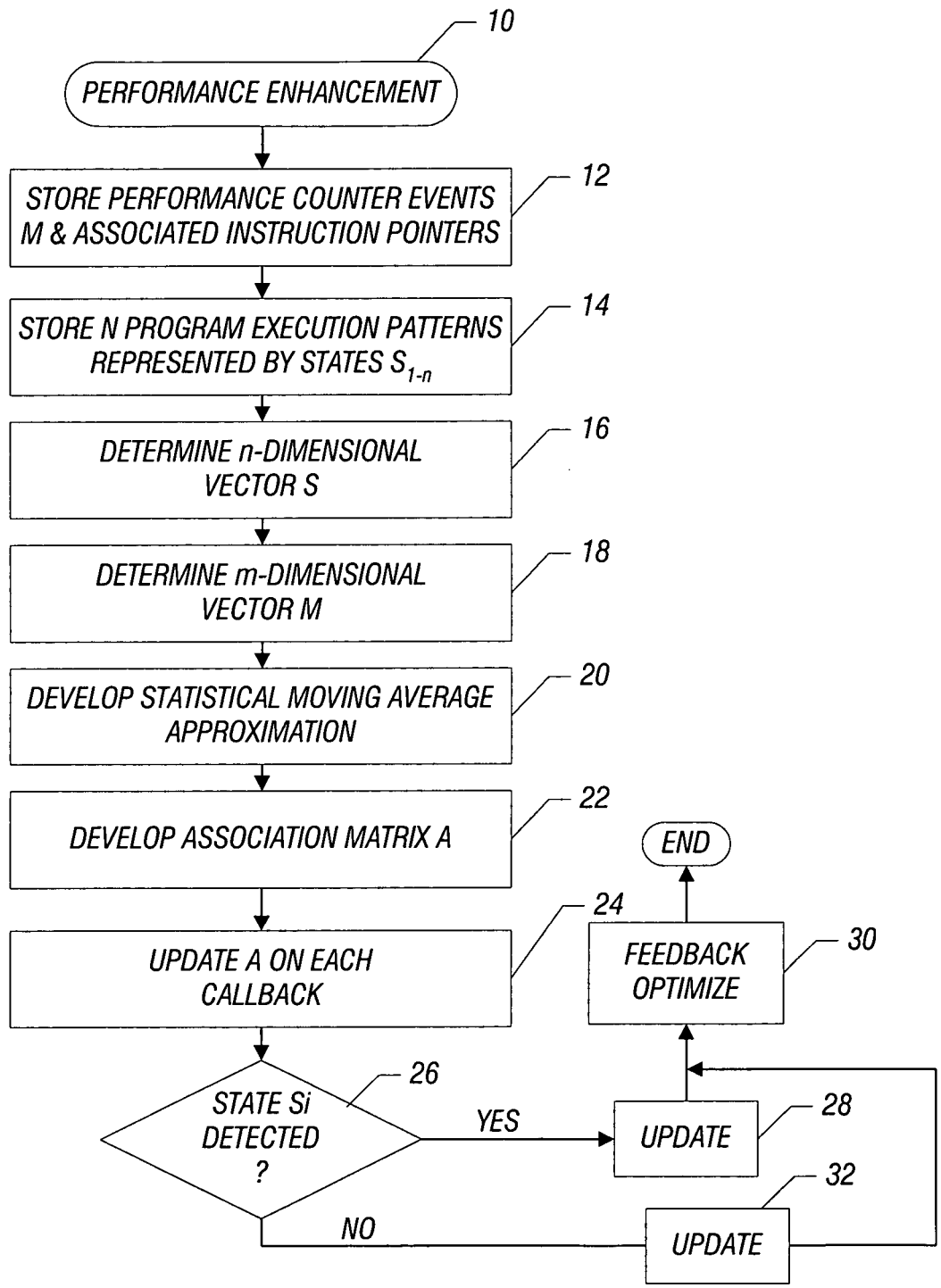
FIG. 3 is a flow chart for software in accordance with one embodiment of the present invention.

Referring to FIG. 3, the process or method 10 for performance enhancement may begin by storing performance counter events M and associated instruction pointers as indicated in block 12. The method 10 may also store n program execution states S as indicated in block 14. Then, an n dimensional vector S may be determined, as indicated in block 16, as may an m dimensional vector M as indicated in block 18.

A statistical moving approximation may be developed as indicated in block 20. The association matrix 42 may be developed over a series of callbacks as indicated in block 22. The association matrix A may be updated on each successive callback as indicated in block 24. If a state Si is detected, as determined in diamond 26, an association matrix update may occur (block 28) and the feedback may be utilized to optimize the performance of the software as indicated in block 30. In this case, the equation Aij←(Aij*(T−2)+2)/T, discussed previously, is used.

If a state Si is not detected, then the matrix may be updated (block 32) using the equation Aij←Aij*(T−2)/T, discussed previously.

Figure 4:
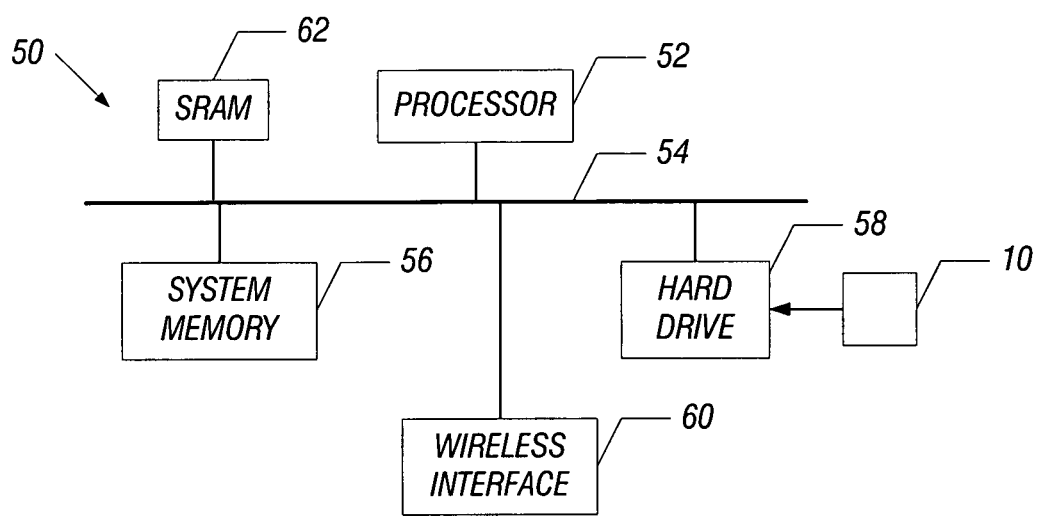
FIG. 4 is a system in accordance with one embodiment of the present invention.

Referring to FIG. 4, a system 50 may be utilized to execute the firmware, hardware, or software for implementing method 10 in accordance with one embodiment of the present invention. The system 50 may be any processor-based system, including a server. The system 50 may include one or more processors 52, coupled by a bus 54, to a system memory 56 and a hard drive 58. The hard drive 58, for example, may store the software 10. Thus, in some embodiments of the present invention, the software 10 may be external to the processor(s) 52. In other embodiments, the software 10 may be internal or part of the internal code of one or more processors 52.

A wireless interface 60 may be coupled to the bus 54 in order to facilitate wireless communications. For example, the wireless interface 60 may be a dipole antenna. Also coupled to the processor 52 may be a static random access memory (SRAM) 62.

Embodiments of the process or method 10 may be implemented in hardware, firmware, or a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
correlating a program execution sequence with performance counter events associated with instruction pointers;
storing said performance counter events and the associated instruction pointers;
determining a vector representing said performance counter events;
developing the association matrix for feedback based optimization;
using a statistical moving average approximation to develop an association matrix;
updating said association matrix on successive callbacks; and
using a correlation between said program execution sequence and said performance counter events to optimize a software code.

2. The method of claim 1 further comprising storing a program execution sequence represented by program execution states.

3. The method of claim 2 further comprising developing a vector representing said program execution sequence.

4. The method of claim 3 further comprising updating said association matrix on two successive callbacks.

5. The method of claim 4 further comprising using a correlation between a program execution sequence and program counter events to optimize a software code.

6. A non-transitory machine accessible medium having instructions that, when executed, cause a system to:
correlate a program execution sequence with performance counter events associated with instruction pointers;
store said performance counter events and the associated instruction pointers;
determine a vector representing said performance counter events;
develop the association matrix for feedback based optimization;
use a statistical moving average approximation to develop an association matrix;
update said association matrix on successive callbacks; and
use a correlation between said program execution sequence and said performance counter events to optimize a software code.

7. The medium of claim 6 further comprising instructions that, when executed, cause the system to use callbacks from a performance counter to associate a program execution sequence with program counter events.

8. The medium of claim 6 further comprising instructions that, when executed, cause the system to store a program execution sequence represented by program execution states.

9. The medium of claim 8 further comprising instructions that, when executed, cause the system to develop a vector representing said program execution sequence.

10. The medium of claim 9 further comprising instructions that, when executed, cause the system to update said association matrix on two successive callbacks.

11. The medium of claim 10 further comprising instructions that, when executed, cause the system to use a correlation between a program execution sequence and program counter events to optimize software code.

12. A system comprising:
a processor; and
an optimization unit to:
said optimization unit to correlate a program execution sequence with performance counter events associated with instruction pointers, store said performance counter events and the associated instruction pointers, determine a vector representing said performance counter events, and develop the association matrix for feedback based optimization;
use a statistical moving average approximation to develop an association matrix;
update said association matrix on successive callbacks; and
use a correlation between said program execution sequence and said performance counter events to optimize a software code.

13. The system of claim 12 wherein said unit to use callbacks from a performance counter to associate a program execution sequence with program counter events.

14. The system of claim 12 wherein said processor includes a performance counter.

* * * * *